US006428251B1

United States Patent
Steven

(10) Patent No.: US 6,428,251 B1
(45) Date of Patent: Aug. 6, 2002

(54) SYSTEM AND METHOD FOR SUPPORTING A WORKPIECE FROM A MILLING VISE

(76) Inventor: John R. Steven, 10461 Nelson Ct., Westminster, CO (US) 80021

( * ) Notice: Subject to any disclaimer, the term of this patent is extended or adjusted under 35 U.S.C. 154(b) by 0 days.

(21) Appl. No.: 09/633,565

(22) Filed: Aug. 7, 2000

(51) Int. Cl.[7] .............................. B23C 9/00; B25B 1/00; B23Q 1/04
(52) U.S. Cl. ........................ 409/131; 269/88; 269/110; 409/219; 409/225
(58) Field of Search ................................ 409/219, 218, 409/225, 227, 224, 131, 132; 269/88, 110, 271, 279, 304, 155

(56) References Cited

U.S. PATENT DOCUMENTS

| | | | | |
|---|---|---|---|---|
| 1,971,069 A | * | 8/1934 | Heinrich | 269/155 |
| 2,274,428 A | | 2/1942 | Odin | |
| 2,723,579 A | * | 11/1955 | Johnson | 409/219 |
| 2,741,145 A | | 4/1956 | Bahorik | |
| 3,186,706 A | | 6/1965 | De Felice | |
| 4,181,296 A | * | 1/1980 | Bassett | 269/88 |
| 4,418,901 A | | 12/1983 | Woods et al. | |
| 4,422,629 A | | 12/1983 | Carlson | |
| 4,529,183 A | | 7/1985 | Krason et al. | |
| 4,750,722 A | * | 6/1988 | Chick | 269/110 |
| 4,807,863 A | * | 2/1989 | Yang | 269/153 |
| 4,928,937 A | | 5/1990 | Bernstein | |
| 5,197,721 A | | 3/1993 | Ruberg | |
| 5,222,997 A | | 6/1993 | Montgomery | |
| 5,312,097 A | | 5/1994 | Womack | |

* cited by examiner

Primary Examiner—William Briggs
(74) Attorney, Agent, or Firm—Ramon L. Pizarro; Edwin H. Crabtree

(57) ABSTRACT

A system that allows support of a work piece from the body of a vise, the vise being attached to the bed of a mill. The system an extender block that attaches to one of the jaws of the vise; and an angular surface plate attached to the extender block. The angular surface plate provides a surface that extends along a plane that extends next to and below the bed of the mill.

15 Claims, 5 Drawing Sheets

SYSTEM AND METHOD FOR SUPPORTING A WORKPIECE FROM A MILLING VISE

BACKGROUND OF THE INVENTION

1. (a) Field of the Invention

This invention generally relates to a system and method for providing a support for a work piece; the support being from the end of a milling vise mounted on the table of a vertical mill. More particularly, but not by way of limitation, to an attachment and method for creating parts using a vertical mill by mounting an extension piece that creates a surface at a distance from the edge of the mill table and allows the mounting of a support surface that extends from the edge of the mill table.

2. (b) Discussion of Known Art

The machining of components often requires the cutting down of surfaces and then the drilling or working of other features into the work piece. Perhaps one of the most useful machining devices for working articles from metal, wood, or other raw material, is the use of a mill. An important milling device is the vertical mill, which includes a table on which a work piece is mounted as the mill is brought down to machine the desired features on the work piece.

An important factor to consider while using a mill or other machining equipment is the time required to set up the machinery to support the work piece at a desired position so that it can receive the mill tool and allow machining of the surfaces of the work piece. Also of importance is the fact that if a particular operation cannot be carried out with a specific piece of equipment, a suitable machine must be found. This can be a problem in a machine shop where equipment is assigned for specific jobs, and the set-up and take-down times can play important roles in selecting when a particular piece of equipment is used to machine a particular work piece.

The usefulness of the vertical mill is well recognized. However, an unfortunate drawback of the use of a vertical mill is the fact that the mill is somewhat limited in that the work piece must fit between the mill tool, which is mounted on the head of the mill, and the table. This distance is further shortened by the fact that the work piece must be held in place with the use of a vise that attaches to the surface of the table.

To enhance the versatility of the vertical mill, many devices for enlarging the width of the grip of a mill vise have been developed. This includes devices such as attachment taught in U.S. Pat. No. 5,197,721 to Ruberg, and U.S. Pat. No. 4,422,629 to Carlson. Other vises or gripping devices that may be used to support a work piece can be found in U.S. Pat. No. 5,312,097 to Womack, U.S. Pat. No. 5,222,997 to Montgomery, U.S. Pat. No. 4,928,937 to Bernstein, U.S. Pat. No. 4,529,183 to Krason et al., U.S. Pat. No. 4,418,901 to Woods et al., U.S. Pat. No. 3,186,706 to De Felice, U.S. Pat. No. 2,274,428 to Odin, and U.S. Pat. No. 2,741,145 to Bahorik.

A significant problem that presents itself while working on a vertical mill is the problem of achieving the desired clearance between the mill head or tool and the work piece. Therefore, for example, if a technician is working on a long, cylindrical work piece which requires the machining of flat surfaces on its sides, and the drilling of a hole in one of its ends, the technician may be able to carry out all of the necessary operations on the side of the work piece, but then have to move to another machine, such as a lathe or drill, to add the hole on the end. This may require special attention to scheduling of these other machines, and may result in lost productivity for the shop.

Thus, there is a need for a device that allows use of the mill on parts or work pieces that are larger, at least in the direction of the work to be done, than the distance between the tool on the mill head and the vise mounted on the table.

Still further, there remains a need for a device that allows a technician to expand the number of operations that may be carried out on a particular machine, such as the vertical mill.

SUMMARY

It has been discovered that the problems left unanswered by known art can be solved by providing a system that allows support of a work piece from the body of a vise, the vise being attached to the bed of a mill, the system or device includes:

1) an extender block that attaches to one of the jaws of the vise; and
2) an angular surface plate attached to the extender block. The angular surface plate providing a surface that extends along a plane that extends next to the bed of the mill.

It is important to note that, as used herein, the phrase "angular surface plate" is intended to describe the fact that the plate includes "angular surfaces" or surfaces at an angle to one another.

According to a highly preferred embodiment of the invention the angular surface plate is fastened to the extender block and provides a vertical surface that extends along a plane that is normal to the plane of the bed of the mill. According to a highly preferred embodiment of the invention, the angular surface plate extends below the plane of the bed of the mill. Additionally, it is contemplated that the angular surface plate will include attachments or attachment points that allow the user to modify the angular surface plate by adding guide plates or attachments for supporting other tools. Thus, it is contemplated that the angular surface plate will serve to position and support a work piece beyond the edge and below the surface of the bed of the mill.

The cooperation of the angular surface plate and the extender block is preferably accomplished through the use of guide pins or alignment dowel-type components that allow the angular surface plate to be precisely positioned and held against the extender block.

Thus, it will be understood that the disclosed invention adds versatility to the mill vise and saves valuable time in the set-up of a work piece. It will be appreciated that the disclosed invention allows the mill to be used to machine parts that, until now, could not be efficiently supported between the bed and the head of the mill to allow the mill to be used in machining these large parts.

Furthermore, it will be understood that the disclosed components are examples of the best method currently devised for assembling a versatile tool that allows extension of the mill vise and imparts additional usefulness to the vertical mill.

It will become apparent to those with ordinary skill in the art that the disclosed invention also includes a method for machining work pieces that ordinarily would not fit between the bed and the head of the mill. The disclosed invention allows the user to attach a particularly large, or long work piece immediately next to the bed, so that the work piece extends below the surface of the plane of the bed. The head of the mill would then be brought over the work piece and the milling operations carried out on the work piece.

Further, it will be appreciated that the disclosed invention is particularly useful in conjunction with a vertical mill, whether the mill is of the column-and-knee type or the fixed-bed type of milling machine. In the fixed bed applications, the disclosed invention greatly improves the versatility of the mill, allowing the mill to be used for a larger variety of parts and milling operations.

Thus, it should be understood that while the above and other advantages and results of the present invention will become apparent to those skilled in the art from the following detailed description and accompanying drawings, showing the contemplated novel construction, combinations and elements as herein described, and more particularly defined by the appended claims, it should also be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
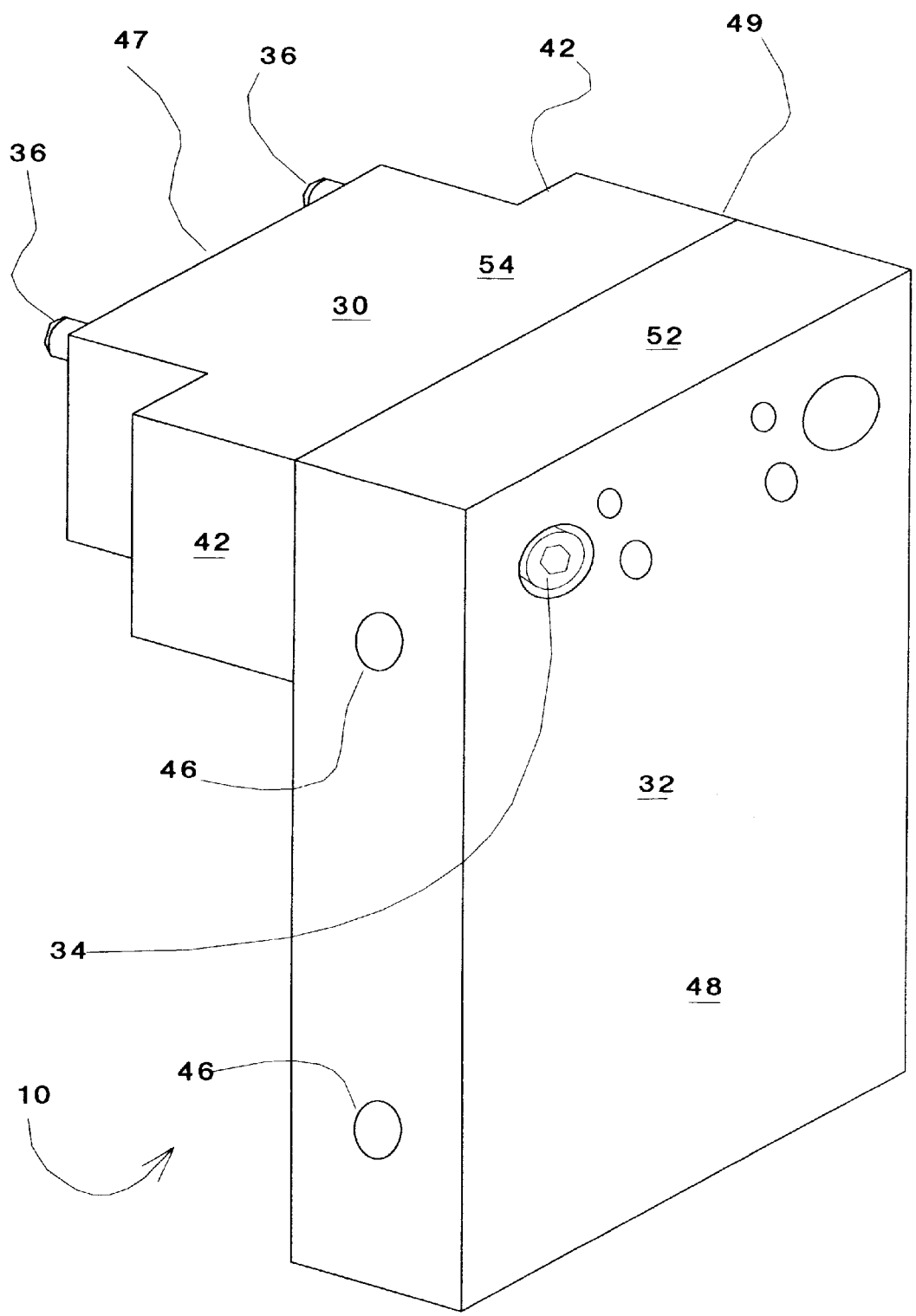
FIG. 1 is a perspective view of an embodiment of the invention separate from the mill vise.

Turning now to FIG. 1 where a system 10 for use on a vise 12, such as a mill vise that has a body 14 with a pair of jaws 16. One of the jaws 16 is a stationary jaw 18 and the other jaw 16 is a movable jaw 20 that moves along a generally linear path 21. The body 14 of the vise 12 has been adapted for mounting of the bed 22 of a milling machine or mill 24.

The bed 22 of the mill 24 includes a bed surface 26 that is generally planar, although it is likely to include tracks or guides on which the vise 12 is mounted. The bed surface 26 terminates in edges 28 that are above the floor on which the mill 24 is mounted. The vise 12 is mounted on the bed surface 26 of the bed 22 of the mill 24.

Figure 2:
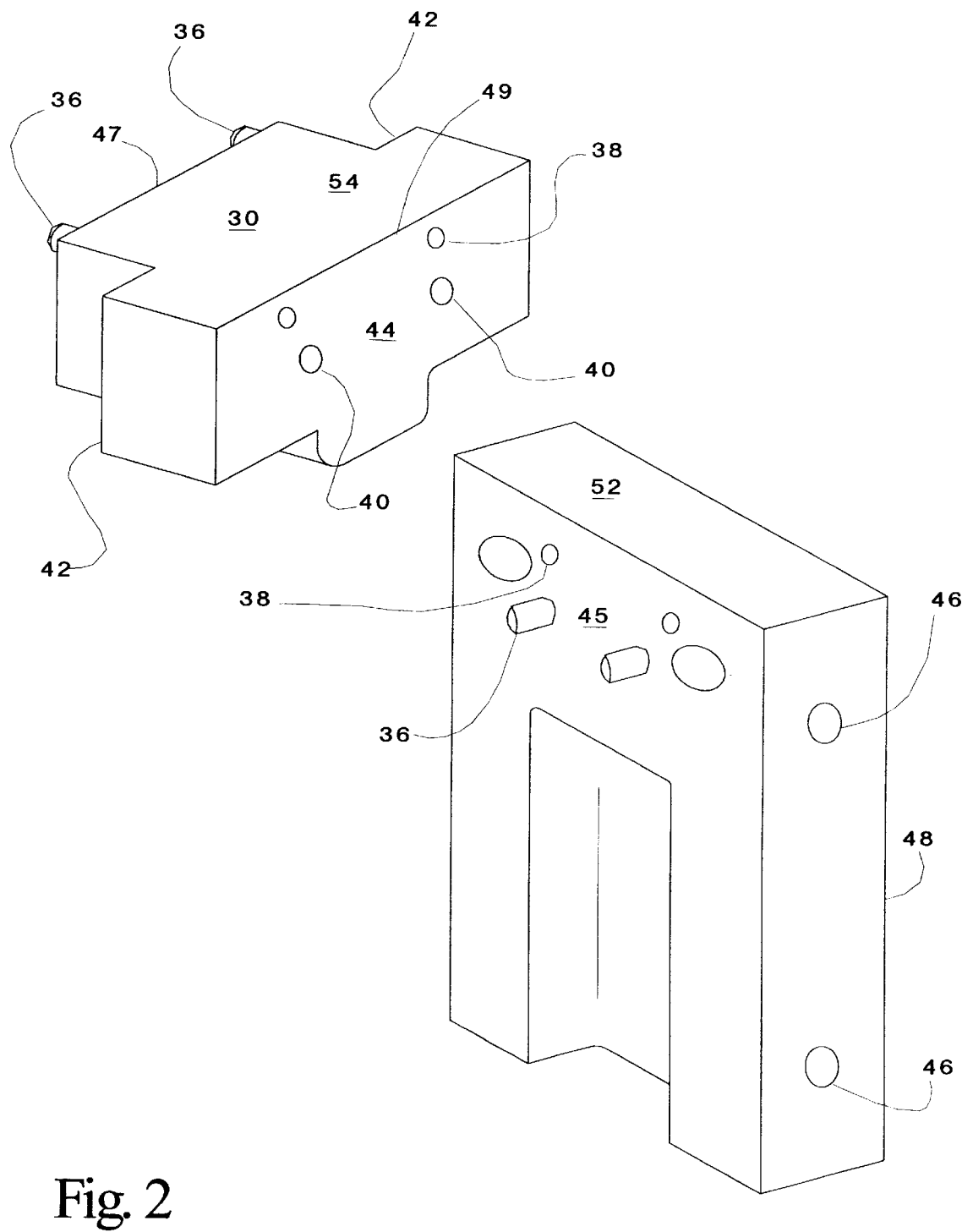
FIG. 2 is a perspective view of the main components of the disclosed invention, the view illustrating mating components of the extender block and of a preferred embodiment of the angled surface plate.
Figure 3:
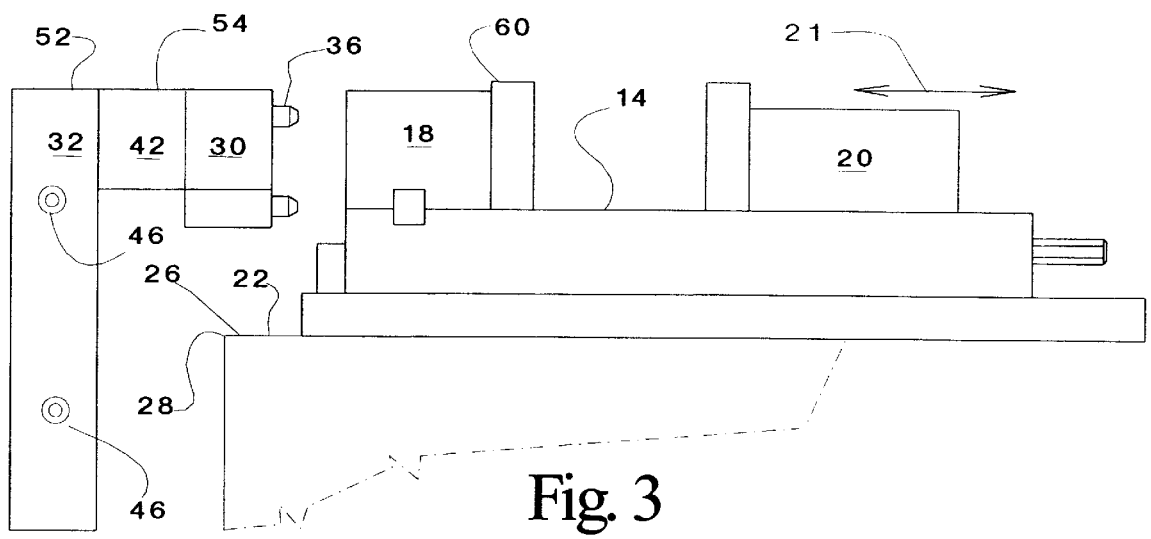
FIG. 3 is a side view of the invention as it is about to be mounted on a vise.
Figure 4:
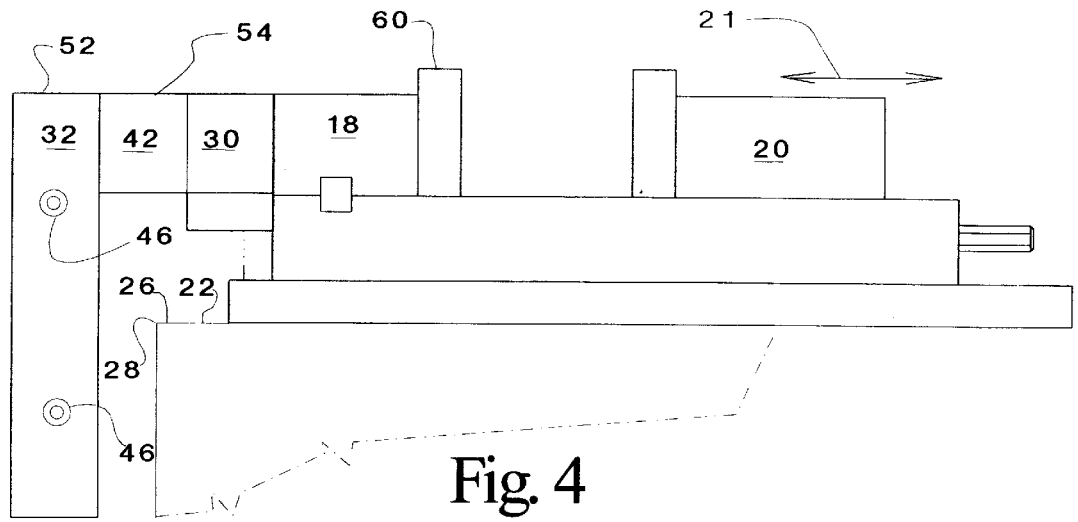
FIG. 4 is a side view of an embodiment of the invention, and illustrates positioning of the components to create a surface that lies along a plane that extends along the highest portion of the vise jaws.

As illustrated in FIGS. 1 and 2, the system 10 includes an extender block 30 and an angled surface block 32. The extender block 30 attached directly to the stationary jaw 18 of the vise 12, and the angled surface block 32 attaches against the extender block 30. Preferably, at least one fastener 34 will be used to hold the angled surface block 32 and the extender block against the stationary jaw 18. Of course, it is contemplated that various other mechanisms, such as pins, toggle or cammed mechanisms, or other suitable fastening or attachment mechanism may be used to hold the angled surface block 32 and the extender block a desired position against the stationary jaw 18.

As shown on FIG. 2, a preferred embodiment of the extender block 30 includes indexing studs 36 and fastener holes 38, and index pin receiver holes 40. Also, a preferred embodiment of the invention includes clamp mounting tabs 42 that project from the extender block 30. As illustrated, the index pin receiver holes 40 are preferably positioned on a coupling face 44 that matches and cooperates with a joint face 45 found on the angled surface block 32.

The example illustrated in FIG. 2 includes fastener holes 38 that can accept fasteners that will attach the extension block 30 alone against the stationary jaw 18. Additionally, it is contemplated that the angled surface block 32 may then be attached directly to the extender block 30 or directly to the stationary jaw 18 with a fastener that extends through the extender block 30 and into the stationary jaw 18.

Figure 7:
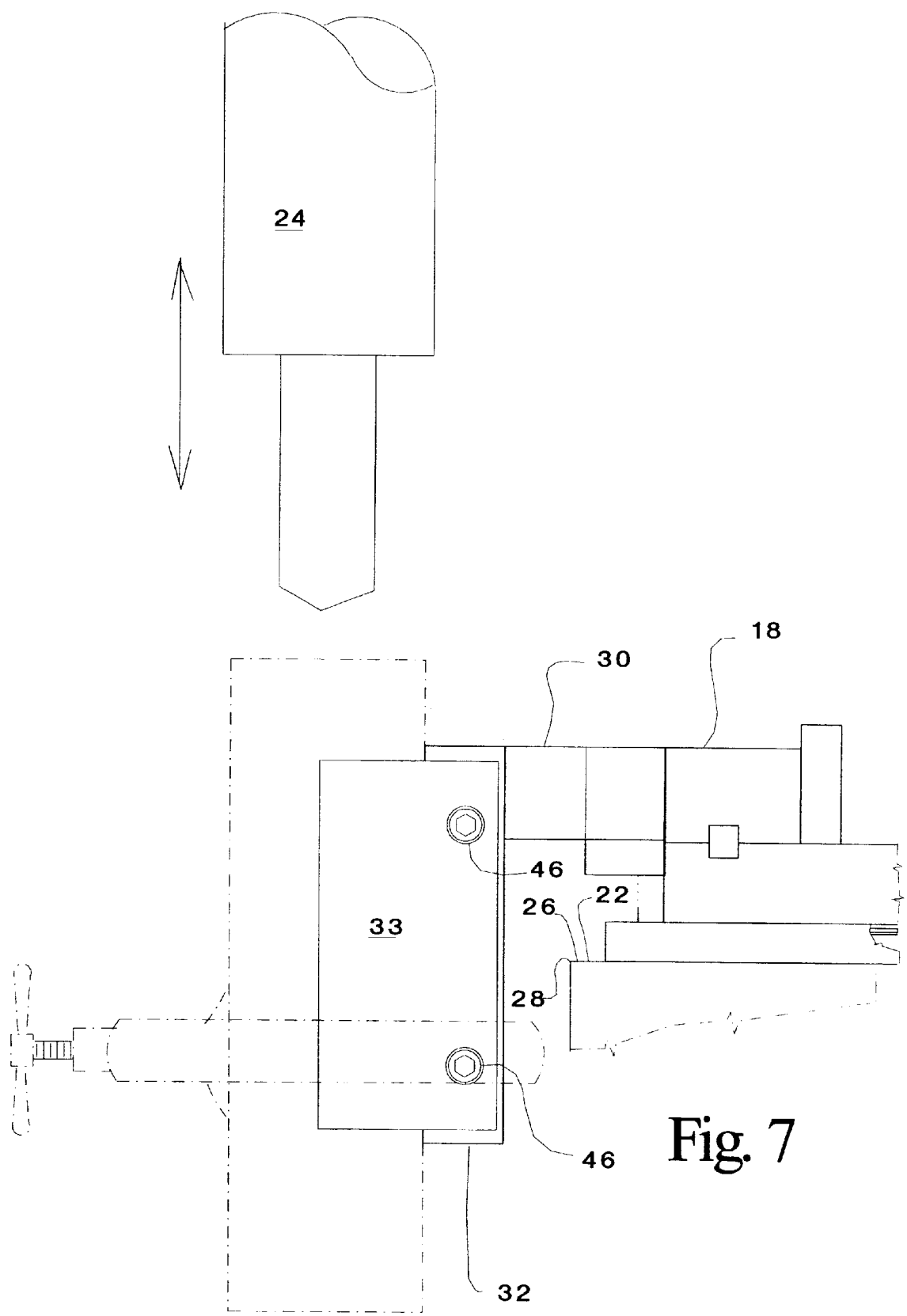
FIG. 7 illustrates the use of side plates to further guide and support a work piece below the tool attached to the mill head (not shown).

FIG. 2 also illustrates that the angled surface block 32 includes side attachment points 46 that allow the attachment of guide plates 33, shown on FIG. 7, or other guides or tools that may cooperate with the surfaces provided by the angled surface block 32. Additionally, the extender block 30 includes a first end 47 and a second end 49, the second end 49 cooperating with the angled surface block 32, while the first end 47 is adapted for mounting against one of the jaws, preferably the stationary jaw 18 of the vise 12.

Figure 5:
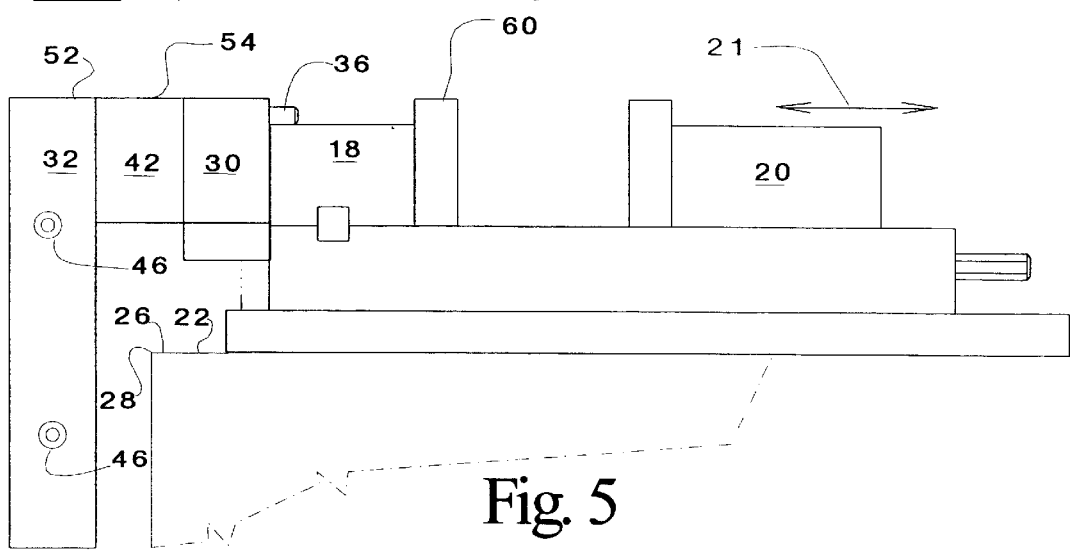
FIG. 5 is a side view of the invention mounted on a vise.
Figure 6:
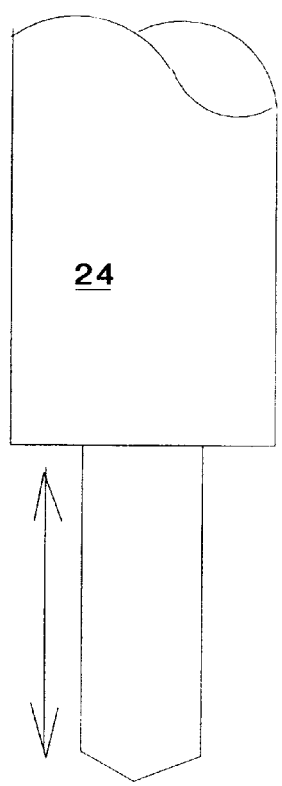
FIG. 6 illustrates the use of the disclosed invention to support a work piece under a tool attached to the mill head (not shown).
Figure 6:
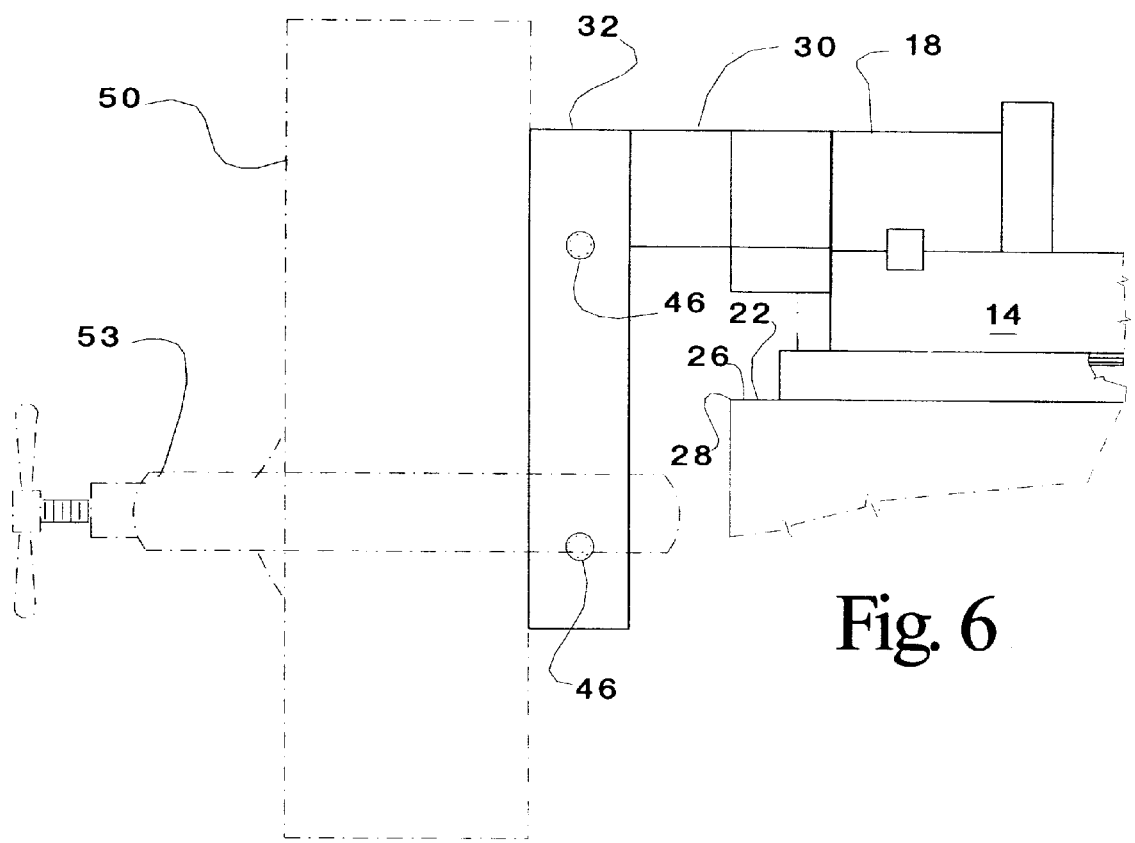

Turning now to FIGS. 1 and 3 through 6, it will be understood that the angled surface block 32 will provide a vertical support surface 48 that will provide support and alignment to a work piece 50 that has been mounted against the vertical support surface 48 as shown on FIG. 6, for example. Attachment of the work piece 50 against the vertical support surface 48 may be accomplished by simply clamping the work piece 50 against the vertical support surface 48 with the use of a C-clamp 52 or similar device. The C-clamp 53 may be attached directly to the angled surface block 32 or may extend between the tabs 42 and the work piece 50. Of course, it is contemplated that the work piece 50 may be clamped directly against the extender block 30, without the use of the angled surface block 32 in the appropriate circumstance.

Turning now to FIG. 5, it will be understood that in a preferred embodiment of the invention the angled surface block 32 and the extender block 30 will have an upper planar surface. Upper planar surface 52 found on the angled surface block 32 and planar surface 54 found on the extender block. As shown on FIGS. 2 and 3, it is contemplated that the extender block will be attachable against the stationary jaw 18 in at least two positions. One position, shown on FIG. 4, creates a flat surface 56 that lines up with the body 14 of the vise, and a second position where the planar surfaces 52 and 52 align with the highest point 60 of the jaws. This allows extension of a planar surface along a plane that is parallel to the bed 22 and the provision of a planar surface, surface 48, that extends beyond and below the bed 22 to provide a vertical planar support surface that extends below the bed of the bed 22.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A system for use on a vise having a body that includes a pair of jaws, the vise being mounted on the bed of a mill, the bed being generally planar and at a distance from a floor surface, the bed terminating on at least one edge, one of the jaws of the vise being a stationary jaw, the other jaw being a movable jaw that moves along a generally linear path, the system comprising:

an extender block, the extender block having a body with a first end and a second end, the first end being adapted for mounting against one of the jaws of the vise; and an angled surface block that has been adapted for attachment to the extender block, the angled surface plate having a vertical support surface that extends along a plane that is generally normal to the generally linear path of motion of the movable jaw, the vertical support surface being adapted for extending below the bed, so that the angled surface block provides vertical support that extends next to and below the bed of the mill.

2. A system according to claim 1 wherein said angled surface block comprises a planar surface, and the angled surface block is adapted for attachment to the extender block, positioning the planar surface of the angled surface block and the planar surface of the extender block in a substantially coplanar arrangement.

3. A system for use on a vise having a body that includes a pair of jaws, one of the jaws being a stationary jaw, the other jaw being a movable jaw that moves along a generally linear path, the vise being mounted on the bed of a mill, the bed being generally planar an at a distance from a floor surface, the stationary jaw having a high point above the bed, the bed terminating on at least one edge, the system comprising:

an extender block, the extender block having a body with a first end and a second end, the first end being adapted for mounting against one of the jaws of the vise; and an angled surface block that has been adapted for attachment to the extender block, the angled surface block having a vertical support surface that extends along a plane that is generally normal to the generally linear path of motion of the movable jaw, the vertical support surface being adapted for extending below the bed, so that the angled surface block provides vertical support that extends next to and below the bed of the mill.

4. A system according to claim 1 wherein said extender block further comprises lugs adapted for providing an attachment point for a clamp.

5. A system according to claim 1 wherein said angled surface block further comprises at least one guide plate that extends at a right angle to the vertical support surface of the angled surface block.

6. A system according to claim 1 wherein said extender block is attachable against the stationary jaw of the vise with the planar surface of the angled surface block and the planar surface of the extender block in a substantially coplanar arrangement with a high point on the vise.

7. A system according to claim 3 wherein said extender block further comprises a planar surface and said angled surface block comprises a planar surface, and the angled surface block being adapted for attachment to the extender block positioning the planar surface of the angled surface block and the planar surface of the extender block in a substantially coplanar arrangement.

8. A system according to claim 7 wherein said extender block is attachable against the stationary jaw of the vise with the planar surface of the angled surface block and the planar surface of the extender block in a substantially coplanar arrangement with the high point on the vise.

9. A method for producing a machined part on a mill by providing a vertical support surface for use with a mill vise having a body that includes a pair of jaws, one of the jaws being a stationary jaw, the other jaw being a movable jaw that moves along a generally linear path the vise being mounted on the bed of a mill, the bed being generally planar an at a distance from a floor surface, the bed terminating on at least one edge, the method comprising:

providing an extender block, the extender block having a body with a first end and a second end, the first end being adapted for mounting against one of the jaws of the vise; and providing an angled surface block that has been adapted for attachment to the extender block;

attaching the angled surface block to the extender block to provide a planar surface that is generally normal to the generally linear path of motion of the movable jaw next to and below the bed of the mill.

10. A system according to claim 3 wherein said extender block further comprises lugs adapted for providing an attachment point for a clamp.

11. A system according to claim 3 wherein said angled surface block further comprises at least one guide plate that extends at a right angle to the vertical support surface of the angled surface block.

12. A method according to claim 9 wherein said extender block further comprises a planar surface and said angled surface block comprises a planar surface, and the angled surface block being adapted for attachment to the extender block positioning the planar surface of the angled surface block and the planar surface of the extender block in a substantially coplanar arrangement.

13. A method according to claim 9 wherein said extender block further comprises lugs adapted for providing an attachment point for a clamp.

14. A method according to claim 9 wherein said angled surface block further comprises at least one guide plate that extends at a right angle to the vertical support surface of the angled surface block.

15. A method according to claim 12 wherein said extender block is attachable against the stationary jaw of the vise with the planar surface of the angled surface block and the planar surface of the extender block in a substantially coplanar arrangement with the high point on the vise.

* * * * *